(12) United States Patent
Ye et al.

(10) Patent No.: US 9,497,390 B2
(45) Date of Patent: Nov. 15, 2016

(54) VIDEO PROCESSING METHOD, APPARATUS, AND SYSTEM

(71) Applicant: ZTE Corporation, Shenzhen, Guangdong (CN)

(72) Inventors: Xiaoyang Ye, Shenzhen (CN); Ming Li, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 52 days.

(21) Appl. No.: 14/408,391

(22) PCT Filed: Jul. 22, 2013

(86) PCT No.: PCT/CN2013/079835
§ 371 (c)(1),
(2) Date: Dec. 16, 2014

(87) PCT Pub. No.: WO2014/015780
PCT Pub. Date: Jan. 30, 2014

(65) Prior Publication Data
US 2015/0172558 A1    Jun. 18, 2015

(30) Foreign Application Priority Data
Jul. 23, 2012 (CN) .......................... 2012 1 0256064

(51) Int. Cl.
*H04N 7/14* (2006.01)
*H04N 5/265* (2006.01)
(Continued)

(52) U.S. Cl.
CPC ................ *H04N 5/265* (2013.01); *H04N 7/15* (2013.01); *H04N 19/90* (2014.11)

(58) Field of Classification Search
USPC ............. 348/14.08, 14.09, 14.1, 24, 211.12, 348/211.14, 598, 608, 14.07, 333.02, 348/333.05
See application file for complete search history.

(56) References Cited

U.S. PATENT DOCUMENTS 8,890,922 B2 * 11/2014 Liu .................... H04N 5/23238
348/14.07
2009/0015661 A1    1/2009 King
(Continued)

FOREIGN PATENT DOCUMENTS

CN    101977305 A    2/2011
CN    102111605 A    6/2011
(Continued)

OTHER PUBLICATIONS

International Search Report in international application No. PCT/CN2013/079835, mailed on Oct. 17, 2013.
(Continued)

*Primary Examiner* — Yosef K Laekemariam
(74) *Attorney, Agent, or Firm* — Oppedahl Patent Law Firm LLC (57) ABSTRACT

Disclosed is a video processing method. The method comprises: splicing, according to pre-determined video sorting information, two or more original video images, to obtain a composite video image; encoding the composite video image; and sending out the encoded composite video image. Correspondingly, also disclosed are a video processing apparatus and system, which can ensure strict synchronization between multiple channels of videos in a telepresence meeting; moreover, the problem of how to determine a video image output position is solved, so that the telepresence meeting renders a vivid communication effect.

15 Claims, 3 Drawing Sheets

(51) Int. Cl.
*H04N 7/15* (2006.01)
*H04N 19/90* (2014.01)

(56) References Cited

U.S. PATENT DOCUMENTS

| | | | |
|---|---|---|---|
| 2009/0257680 A1* | 10/2009 | Dhand | G06T 7/0026 382/284 |
| 2010/0128105 A1 | 5/2010 | Halavy | |
| 2010/0171881 A1 | 7/2010 | Castellan | |
| 2012/0033030 A1 | 2/2012 | Liu | |
| 2012/0287222 A1 | 11/2012 | Liu | |
| 2012/0300018 A1* | 11/2012 | Li | H04N 7/152 348/14.09 |
| 2013/0300819 A1 | 11/2013 | Halavy | |

FOREIGN PATENT DOCUMENTS

| | | |
|---|---|---|
| CN | 102226943 A | 10/2011 |
| CN | 102547212 A | 7/2012 |
| WO | 2011091604 A1 | 8/2011 |
| WO | 2012059280 A2 | 5/2012 |

OTHER PUBLICATIONS

English Translation of the Written Opinion of the International Search Authority in international application No. PCT/CN2013/079835, mailed on Oct. 17, 2013.
Supplementary European Search Report in European application No. 13822250.0, mailed on Jun. 18, 2015.

* cited by examiner

VIDEO PROCESSING METHOD, APPARATUS, AND SYSTEM

TECHNICAL FIELD

An embodiment of the disclosure relates to video conference technology, and particularly to a video processing method, apparatus, and system.

BACKGROUND

Telepresence enjoys great popularity among high-end users due to a true sense of on-scene presence thereof. Auditory positioning and life size imaging are key technical indicators in evaluating a telepresence system.

To achieve life size imaging and auditory positioning in a telepresence conference system, each display of a terminal meeting room having multiple displays may display an image of conferees in a remote spatial area according to a direction in which an audio is output. Namely, in the meeting room, a display displaying the image of a speaker corresponds to the direction in which the audio of the speaker is output. For example, in a three-display meeting room, if a speaker seated on the left speaks, then sound should be heard from the left. Therefore, A position where a remote image is output has to be determined according to a negotiated strategy, and strict synchronization among multiple displays is required to achieve realistic communication effect.

The inventors find that in a telepresence conference system, due to difficulty in strict synchronization among multiple video streams encoded and transmitted separately, it is hard to meet a strict real-time requirement of a video conference. In addition, there is no solution for determining a position where a video image is output.

SUMMARY

In view of this, it is desired that embodiments of the disclosure provide a video processing method, apparatus, and system, capable of ensuring strict synchronization among multiple video streams in a telepresence conference.

To this end, a technical solution according to an embodiment of the disclosure is implemented as follows.

An embodiment of the disclosure provides a video processing method, including:

obtaining a composite video image by stitching two or more original video images according to pre-determined video arranging information;

encoding the composite video image; and sending the encoded composite video image.

The video processing method may further include: before the stitching two or more original video images, collecting the two or more original video images respectively by two or more video collecting devices.

The video arranging information may include a correspondence among an identity of a video collecting device collecting each of the two or more original video images, a position of each of the two or more original video images in the composite video image, and an identity of a video displaying device for displaying each of the two or more original video images.

The video processing method may further include: before the stitching two or more original video images, determining the video arranging information by performing media capability negotiation with an endpoint configured for receiving the composite video image.

According to an embodiment herein, a video processing apparatus may include a stitching module, an encoding module, and a sending module.

The stitching module may be configured for obtaining a composite video image by stitching two or more original video images according to pre-determined video arranging information.

The encoding module may be configured for encoding the composite video image obtained by the stitching module.

The sending module may be configured for sending the composite video image encoded by the encoding module.

The apparatus may be further connected to two or more video collecting devices respectively for collecting the two or more original video images.

The video arranging information may include a correspondence among an identity of a video collecting device collecting each of the two or more original video images, a position of each of the two or more original video images in the composite video image, and an identity of a video displaying device for displaying each of the two or more original video images.

The video processing apparatus may further include a first determining module configured for determining the video arranging information by performing media capability negotiation with an endpoint configured for receiving the composite video image.

The stitching module may be configured for obtaining the composite video image by stitching the two or more original video images according to the video arranging information determined by the first determining module.

According to an embodiment herein, a video processing method may include:

receiving a composite video image, wherein the composite video image is obtained by stitching two or more original video images and is then encoded;

decoding the composite video image; and dividing the decoded composite video image into the two or more original video images and respectively sending each of the two or more original video images to a video displaying device for displaying each of the two or more original video images according to pre-determined video arranging information.

The video arranging information may include a correspondence among an identity of a video collecting device collecting each of the two or more original video images, a position of each of the two or more original video images in the composite video image, and an identity of the video displaying device for displaying each of the two or more original video images.

The video processing method may further include: before the dividing the decoded composite video image, determining the video arranging information by performing media capability negotiation with an endpoint configured for sending the composite video image.

According to an embodiment herein, a video processing apparatus may include a receiving module, a decoding module, and a dividing module.

The receiving module may be configured for receiving a composite video image, the composite video image being obtained by stitching two or more original video images and then encoded.

The decoding module may be configured for decoding the composite video image received by the receiving module.

The dividing module may be configured for dividing the decoded composite video image into the two or more original video images and respectively sending each of the two or more original video images to a video displaying device for displaying each of the two or more original video images according to pre-determined video arranging information.

The video arranging information may include a correspondence among an identity of a video collecting device collecting each of the two or more original video images, a position of each of the two or more original video images in the composite video image, and an identity of the video displaying device for displaying each of the two or more original video images.

The video processing apparatus may further include a second determining module configured for determining the video arranging information by performing media capability negotiation with an endpoint configured for sending the composite video image.

The dividing module may be configured for dividing the decoded composite video image into the two or more original video images according to the video arranging information determined by the second determining module.

According to an embodiment herein, a video processing method may include:

obtaining a composite video image by stitching two or more original video images according to pre-determined video arranging information; encoding the composite video image; and sending the encoded composite video image;

receiving the composite video image; decoding the composite video image; and dividing the decoded composite video image into the two or more original video images and respectively sending each of the two or more original video images to a video displaying device for displaying each of the two or more original video images according to the pre-determined video arranging information.

The video processing method may further include: before the stitching two or more original video images, collecting the two or more original video images respectively by two or more video collecting devices.

The video arranging information may include a correspondence among an identity of a video collecting device collecting each of the two or more original video images, a position of each of the two or more original video images, and an identity of the video displaying device for displaying each of the two or more original video images.

The video processing method may further include: determining the video arranging information by performing media capability negotiation.

According to an embodiment herein, a video processing system may include a stitching module, a encoding module, a sending module, a receiving module, a decoding module, and a dividing module.

The stitching module may be configured for obtaining a composite video image by stitching two or more original video images according to pre-determined video arranging information.

The encoding module may be configured for encoding the composite video image obtained by the stitching module.

The sending module may be configured for sending the composite video image encoded by the encoding module.

The receiving module may be configured for receiving the composite video image sent by the sending module.

The decoding module may be configured for decoding the composite video image received by the receiving module.

The dividing module may be configured for dividing the decoded composite video image into the two or more original video images and respectively sending each of the two or more original video images to an external video displaying device for displaying each of the two or more original video images according to the pre-determined video arranging information.

The stitching module may be further connected to two or more video collecting devices respectively for collecting the two or more original video images.

The video processing system may further include a first determining module and a second determining module configured for determining the video arranging information by performing media capability negotiation.

The stitching module may be configured for obtaining the composite video image by stitching the two or more original video images according to the video arranging information determined by the first determining module.

The dividing module may be configured for dividing the decoded composite video image into the two or more original video images according to the video arranging information determined by the second determining module.

The stitching module, the encoding module, the sending module and the first determining module may be provided in a local terminal. The local terminal may be externally connected to a video collecting device. The receiving module, the decoding module, the dividing module, and the second determining module may be provided in a remote terminal. The remote terminal may be externally connected to a video displaying device.

The video processing system may further include a Multipoint Control Unit (MCU) configured for implementing interaction between a local terminal and one or more remote terminals.

The video processing system may include a Multipoint Control Unit (MCU) and multiple terminals including a local terminal and a remote terminal interacting through the MCU.

Each of the multiple terminals may be externally connected to a video collecting device and a video displaying device. Each of the multiple terminals may include the stitching module, the encoding module, the sending module, the receiving module, the decoding module, the dividing module, a first determining module, and a second determining module.

The MCU may include the stitching module, the encoding module, the sending module, the receiving module, the decoding module, the dividing module, the first determining module, and the second determining module.

With a video processing method, apparatus, and system according to an embodiment of the disclosure, multiple original video image streams may be stitched into a composite video image, which is then encoded and sent, thus ensuring strict synchronization among multiple video streams in a telepresence conference. Moreover, a received composite video image may first be divided into the multiple original video images, each of which then may be displayed by a proper video displaying device, providing a solution for determining a position where a video image is output, guaranteeing strict synchronization among multiple displays in a telepresence conference. A video image is output according to a pre-set position, thus achieving realistic communication effect.

BRIEF DESCRIPTION OF THE DRAWINGS

Drawings herein are introduced briefly for clearer illustration of a technical solution. Note that drawings below refer merely to some embodiments of the disclosure. For those skilled in the art, other drawings may be obtained without creative work according to drawings herein.

DETAILED DESCRIPTION

In embodiments of the disclosure, a sending end obtains a composite image by stitching, according to video arranging information negotiated beforehand, multiple video images collected, encodes the composite image, and sends the encoded composite image. After receiving and decoding the composite image, a receiving end divides the decoded composite image into the multiple video images according to the video arranging information, and then sends the multiple video images respectively to display devices each for displaying one of the multiple video images.

Embodiment 1

Figure 1:
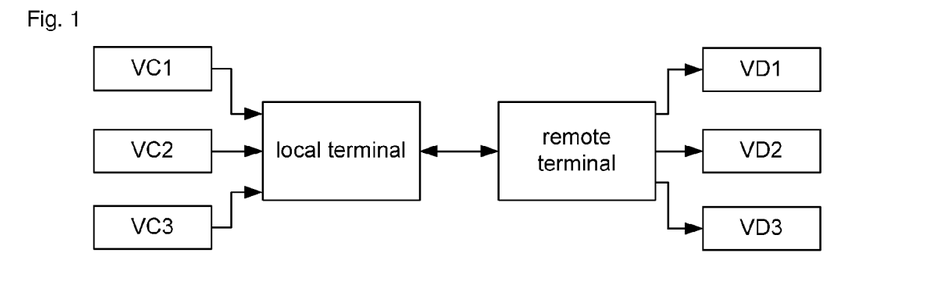
FIG. 1 is a schematic diagram of a structure of a video processing system according to Embodiment 1 of the disclosure.

The embodiment provides a video processing system configured for telepresence. The system includes multiple video collecting devices (VC1, VC2, and VC3), multiple video displaying devices (VD1, VD2, and VD3), a local terminal, and a remote terminal. The multiple video collecting devices are connected to the local terminal. The multiple video displaying devices are connected to the remote terminal. A video collecting device is configured for collecting an original video image, and sends the collected original video image to the local terminal. The local terminal, as a video image sending end, obtains a composite video image by stitching original video images sent by the video collecting devices, and encodes and then sends the composite video image. The remote terminal, as a video image receiving end, receives the composite video image sent by the local terminal, divides the composite video image into the multiple original video images, and then sends the multiple original video images respectively to video displaying devices for displaying the multiple original video images respectively.

As shown in FIG. 1, the local terminal and the remote terminal may be connected to each other via peer-to-peer networking. Three video collecting devices (VC1, VC2, and VC3) connected to the local terminal respectively collect three original video image streams. Three video displaying devices (VD1, VD2, and VD3) connected to the remote terminal respectively display the three original video image streams.

Figure 2:
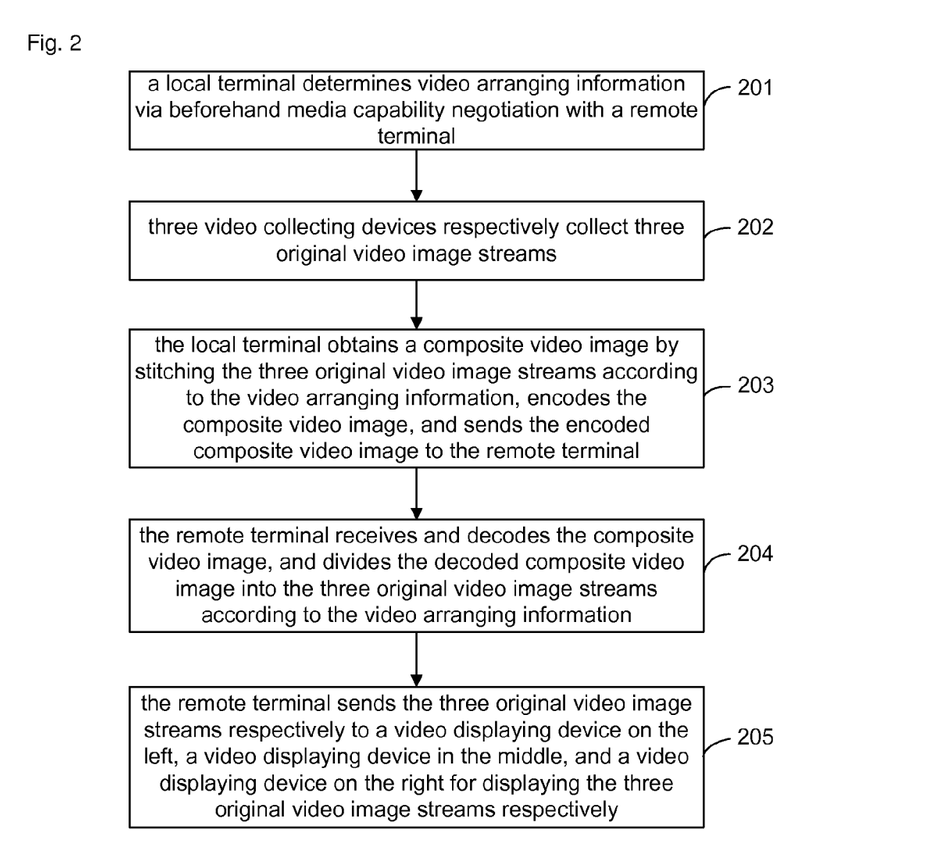
FIG. 2 is a specific flowchart of video processing according to Embodiment 1 of the disclosure.

As shown in FIG. 2, a flow of video processing based on the video processing system may specifically include steps as follows.

In Step 201, a local terminal determines, via beforehand media capability negotiation with a remote terminal, video arranging information configured for indicating to stitch original video images of VC1, VC2, and VC3 from left to right.

In this way, a left original video image stream (VC1), a middle original video image stream (VC2), and a right original video image stream (VC3) respectively collected by three video collecting devices VC1, VC2, and VC3 may be displayed respectively in video displaying devices located respectively on the left (VD1), in the middle (VD2), and on the right (VD3).

A position of a video image collected by a video collecting device may be provided in the video arranging information beforehand. Information such as sizes of video images collected by video collecting devices VC1, VC2, and VC3 and coordinates of the video images in the composite video image may be provided in the video arranging information. For example, a width, a height, and coordinates of a starting point of a video image of the VC1; a width, a height, and coordinates of a starting point of a video image of the VC2; and a width, a height, and coordinates of a starting point of a video image of the VC3 may be provided in the video arranging information. When video images of the VC1, the VC2, and the VC3 are to be stitched together respectively as a left part, a middle part, and a right part of the composite image, it may be provided in the video arranging information an abscissa of the starting point of the video image of the VC1 in the composite video image equal to zero, an abscissa of the starting point of the video image of the VC2 in the composite video image equal to the width of the video image of the VC1, and an abscissa of the starting point of the video image of the VC3 in the composite video image equal to a sum of the widths of the video images of the VC1 and the VC2. Alternatively, information such as sizes of video image collected respectively by the video collecting devices (VC1, VC2, and VC3) and relative positions of the video images in the composite video image may be provided in the video arranging information, such that the local terminal may obtain the composite video image by stitching the video images according to the sizes and the relative positions of the video images in the video arranging information.

A video displaying device for displaying an original video image may also be provided in the video arranging information. With an application in the embodiment, it may be provided in the video arranging information that the VC1 corresponds to the VD1, the VC2 corresponds to the VD2, and the VC3 corresponds to the VD3. The video displaying device VD1 is located on the left. The video displaying device VD2 is located in the middle. The video displaying device VD3 is located on the right.

In Step 202, three video collecting devices (VC1, VC2, and VC3) collect three original video image streams respectively.

In Step 203, the local terminal obtains a composite video image by stitching, according to the video arranging information, three original video image streams collected by the three video collecting devices (VC1, VC2, and VC3), encodes the composite video image, and sends the encoded composite video image to the remote terminal through a media channel between the local terminal and the remote terminal.

In Step 204, the remote terminal receives and then decodes the composite video image, and divides the decoded composite video image into the three original video image streams according to the video arranging information.

In Step 205, the remote terminal sends the three original video image streams respectively to a video displaying device on the left, a video displaying device in the middle, and a video displaying device on the right for displaying the three original video image streams respectively.

After receiving and then decoding the composite video image stream sent by the local terminal, the remote terminal divides the decoded composite video image into the three images VD1, VD2, and VD3 according to the video arranging information as negotiated, and sends the three images respectively to the three video displaying devices for displaying the three images respectively. In this way, the remote terminal first divides the composite video image into multiple video images according to positions of video images collected respectively by the video collecting devices as provided in the video arranging information, and then displays the video images respectively on the video displaying devices accordingly.

The local terminal may include a stitching module, an encoding module, and a sending module. The stitching module may be configured for obtaining a composite video image by stitching original video images sent respectively by video collecting devices according to pre-determined video arranging information. The encoding module may be configured for encoding the composite video image obtained by the stitching module. The sending module may be configured for sending the composite video image encoded by the encoding module to the remote terminal.

The remote terminal may include a receiving module, a decoding module, and a dividing module. The receiving module may be configured for receiving a composite video image sent by the local terminal. The decoding module may be configured for decoding the composite video image received by the receiving module. The dividing module may be configured for dividing the composite video image decoded by the decoding module into original video images and sending the original video images respectively to video displaying devices for displaying the original video images respectively according to pre-determined video arranging information.

The local terminal may further include a first determining module configured for determining the video arranging information by performing media capability negotiation with the remote terminal. The stitching module may be configured for obtaining the composite video image by stitching two or more original video images according to the video arranging information determined by the first determining module.

The remote terminal may further include a second determining module configured for determining the video arranging information by performing media capability negotiation with a terminal configured for sending the composite video image. The dividing module may be configured for dividing the decoded composite video image into the two or more original video images according to the video arranging information determined by the second determining module.

To sum up, in the embodiment, the video arranging information determined through negotiation between the local terminal and the remote terminal may include an identity of a video collecting device, a position of an original video image collected by a video collecting device, an identity of a video displaying device, and a correspondence among the three. The position of an original video image may further contain information such as the side of the original video image collected by a video collecting device.

Embodiment 2

Figure 3:
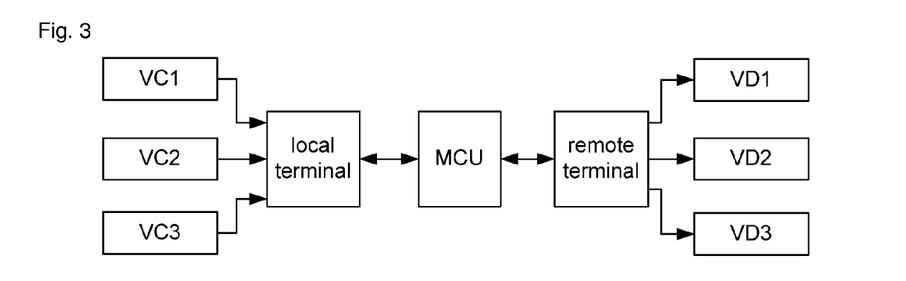
FIG. 3 is a schematic diagram of a structure of a video processing system according to Embodiment 2 of the disclosure.

A structure of a telepresence video processing system according to the embodiment is as shown in FIG. 3, the structure being almost the same as that of the video processing system according to Embodiment 1, except that the video processing system according to Embodiment 2 may further include a Multipoint Control Unit MCU. The local terminal may be networked with the remote terminal through the MCU, that is, data exchange between the local terminal and the remote terminal is performed through the MCU.

Figure 4:
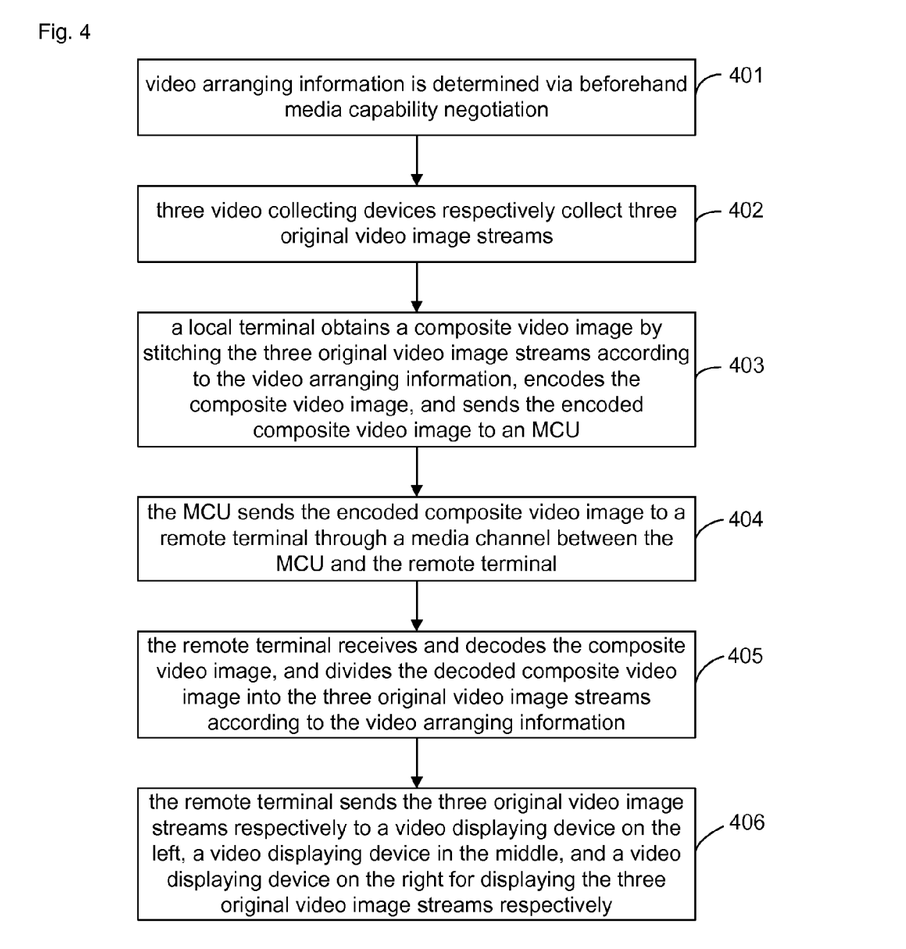
FIG. 4 is a specific flowchart of video processing according to Embodiment 2 of the disclosure.

A video processing flow in the embodiment, as shown in FIG. 4, may include steps as follows.

Step 401 is almost the same as Step 201, except that the media capability negotiation between the local terminal and the remote terminal is performed in directly through the MCU.

That is, in media capability negotiation, the local terminal may determine the video arranging information by performing media capability negotiation with an endpoint configured for receiving the composite video image. The endpoint may be the remote terminal or the MCU.

Step 402 is identical with Step 202.

Step 403 is almost the same as Step 203, except that after encoding the composite video image, the local terminal sends the encoded composite video image to the MCU through a media channel between the local terminal and the MCU.

In Step 404, the MCU sends the encoded composite video image to the remote terminal through a media channel between the MCU and the remote terminal.

Step 405 is almost the same as Step 204, except that the remote terminal receives the composite video image forwarded by the MCU.

Step 406 is identical with Step 205.

The structure of the local terminal in Embodiment 2 is identical with that of the local terminal in Embodiment 1. The structure of the remote terminal in Embodiment 2 is identical with that of the remote terminal in Embodiment 1. The only difference is that in Embodiment 2, the sending module of the local terminal sends the composite video image to the MCU, and the receiving module of the remote terminal receives the composite video image forwarded by the MCU.

Embodiment 3

Figure 5:
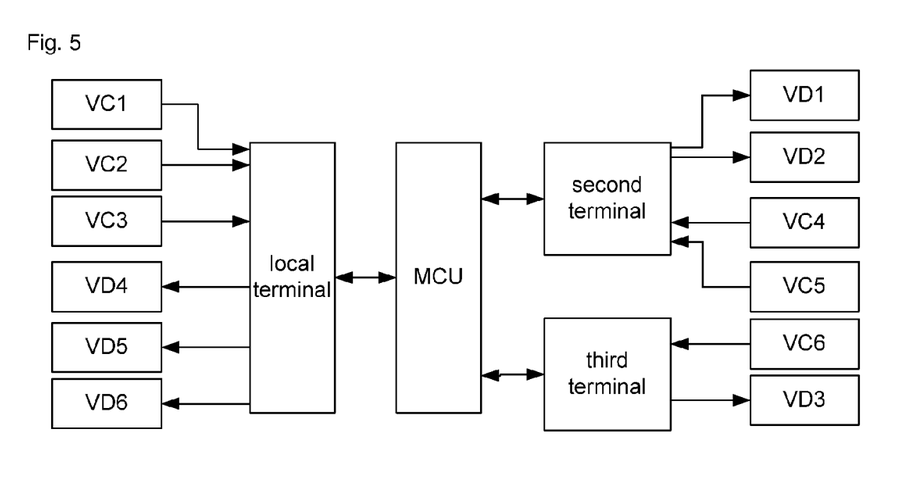
FIG. 5 is a schematic diagram of a structure of a video processing system according to Embodiment 3 of the disclosure.

Embodiment 3 provides a telepresence video processing system. As shown in FIG. 5, the system includes multiple video collecting devices, multiple video displaying devices, an MCU, a first terminal, a second terminal, and a third terminal. The first terminal is connected to three video collecting devices (VC1, VC2, and VC3) and three video displaying devices (VD4, VD, and VD6). The second terminal is connected to two video collecting devices (VC4 and VC5) and two video displaying devices (VD1 and VD2). The third terminal is connected to one video collecting device (VC6) and one video displaying device (VD3). Each of the first terminal, the second terminal and the third terminal may serve as a video image sending end and a video image receiving end at the same time. The first terminal, the second terminal, and the third terminal are networked through the MCU. When the first terminal serves as the local endpoint, both the second terminal and the third terminal serve as the opposite remote endpoints. When both the second terminal and the third terminal serve as the local endpoints, the first terminal serves as the opposite remote endpoint.

In the embodiment, a video processing flow may include steps as follows.

In Step 1, video arranging information may be determined by beforehand media capability negotiation between an MCU and each of a first terminal, a second terminal, and a third terminal, and may be configured to the first terminal, the second terminal, the third terminal, and the MCU.

Video arranging information negotiated by the first terminal and the MCU may include correspondence between VC1 and VD1, correspondence between VC2 and VD2, correspondence between VC3 and VD3, and stitching original video images of VC1, VC2, and VC3 from left to right to form a composite video image; and include correspondence between VC4 and VD4, correspondence between VC5 and VD5, correspondence between VC6 and VD6, and stitching original video images of VC4, VC5, and VC6 from left to right to form a composite video image.

Video arranging information negotiated by the second terminal and the MCU may include correspondence between VC1 and VD1, correspondence between VC2 and VD2, and stitching original video images of VC1 and VC2 from left to right to form a composite video image; and include correspondence between VC4 and VD4, correspondence between VC5 and VD5, and stitching original video images of VC4 and VC5 from left to right to form a composite video image.

In Step 2, three video collecting devices (VC1, VC2, and VC3) respectively collect original video images.

In Step 3, the first terminal obtains a first composite video image by stitching the original video images collected by the three video collecting devices (VC1, VC2, and VC3) according to video arranging information negotiated by the first terminal and the MCU, encodes the first composite video image, and then sends the encoded first composite video image to the MCU through the media channel between the first terminal and the MCU.

In Step 4, the MCU receives and then decodes the first composite video image stream sent by the first terminal, divides the decoded first composite video image into the three original video images according to the video arranging information negotiated by the MCU and the first terminal, obtains a second composite video image by stitching the original video images of VC1 and VC2 according to video arranging information negotiated by the MCU and the second terminal, encodes the second composite video image, sends the encoded second composite video image to the second terminal connected to VD1 and VD2 through a channel between the MCU and the second termina, encodes the original video image of VC3, and sends the encoded original video image of VC3 to the third terminal connected to VD3.

In Step 5, the second terminal receives and decodes the second composite video image sent by the MCU, divides the decoded second composite video image into the two original images of VC1 and VC2 according to the video arranging information negotiated by the MCU and the second terminal, and sends the two original images respectively to VD1 and VD2 which play the two original images respectively. The third terminal receives and decodes the video image of VC3 sent by the MCU, and sends the decoded video image of VC3 to VD3 which plays the received video image of VC3.

Additionally, the video processing flow may further include steps as follows.

In Step 6, two video collecting devices (VC4 and VC5) respectively collect original video images. The second terminal may obtain a third composite video image by stitching the two original video image streams collected by the two video collecting devices (VC4 and VC5) according to video arranging information negotiated by the second terminal and the MCU, encode the third composite video image, and sends the encoded third composite video image to the MCU through a media channel between the second terminal and the MCU. The third terminal may encode an original video image collected by the video collecting device VC6 and then send the encoded original video image of VC6 to the MCU.

In Step 7, the MCU may decode the third composite video image sent by the second terminal, divide the decoded third composite video image into the two original video images of VC4 and VC5 according to the video arranging information negotiated by the MCU and the second terminal. The MCU may decode the original video image stream sent by the third terminal. Then the MCU may obtain a forth composite video image by stitching the three original video image streams according to the video arranging information negotiated by the MCU and the first terminal, encode the forth composite video image, and send the encoded forth composite video image to the first terminal through a media channel between the MCU and the first terminal.

In Step 8, the first terminal may receive and decode the forth composite video image sent by the MCU, divides the decoded forth composite video image into the three original video image streams according to the video arranging information negotiated by the first terminal and the MCU, and send the three original video image streams respectively to VD4, VD5, and VD6 which play the three original video image streams respectively.

Note that the flow of Step 1 to Step 5 and the flow of Step 6 to Step 8 are independent of each other.

Each of the first terminal, the second terminal, the third terminal, and the MCU may contain a stitching module, an encoding module, a sending module, and a first determining module, and may further contain a second determining module, a receiving module, a decoding module, and a dividing module. Each such module may serve basically the same function as a corresponding module in Embodiment 2. A stitching module may be configured for: sending, when there is only one original video image, the original video image directly (i.e. without stitching) to a local encoding module which may encode the received video image; and obtaining, when there are two or more original video images, a composite video image by stitching the two or more original video images according to pre-determined video arranging information, and sending the composite video image to the local encoding module for encoding. A sending module may be configured for sending an original video image or a composite image video encoded by an encoding module to the receiving module of the first terminal, the second terminal, the third terminal, or the MCU. A receiving module may be further configured for receiving an original video image or a composite image video sent by the first terminal, the second terminal, the third terminal, or the MCU. A decoding module may be configured for decoding an original video image or a composite image video received by a receiving module. A dividing module may be configured for dividing a composite video image (instead of an original video image) decoded by a decoding module into original video images according to pre-determined video arranging information, and sending, according to the video arranging information, the original video images respectively to video displaying devices each for playing the received original video image.

In an actual application, a terminal in an aforementioned embodiment may be a hardware device capable of video communication, such as a video conference terminal, a mobile terminal, a set-top box, or the like.

What described are only embodiments of the disclosure, and shall not be used to limit protection scope of the disclosure.

INDUSTRIAL APPLICABILITY

With a video processing method, apparatus, and system according to an embodiment of the disclosure, a sending end obtains a composite image by stitching multiple video images collected according to pre-negotiated video arranging information, encodes the composite image, and then sends the encoded composite image. A receiving end receives and decodes the composite image, divides the decoded composite image into the multiple video images according to the video arranging information, and sends the multiple video images respectively to devices each for displaying a received video image.

With embodiments of the disclosure, multiple original video image streams may be stitched into a composite video image, which is then encoded and sent, thus ensuring strict synchronization among multiple video streams in a telepresence conference. Moreover, a received composite video image may first be divided into the multiple original video images, each of which then may be displayed by a proper video displaying device, providing a solution for determining a position where a video image is output, guaranteeing strict synchronization among multiple displays in a telepresence conference. A video image is output according to a pre-set position, thus achieving realistic communication effect.

What is claimed is:

1. A video processing method, comprising:
   obtaining a composite video image by stitching two or more original video images according to pre-determined video arranging information;
   encoding the composite video image; and
   sending the encoded composite video image,
   wherein the video arranging information comprises a correspondence among an identity of a video collecting device collecting each of the two or more original video images, a position of each of the two or more original video images in the composite video image, and an identity of a video displaying device for displaying each of the two or more original video images.

2. The video processing method according to claim 1, further comprising: before the stitching two or more original video images,
   determining the video arranging information by performing media capability negotiation with an endpoint configured for receiving the composite video image.

3. A video processing apparatus, comprising: a stitching module, an encoding module, and a sending module, wherein
   the stitching module is configured for obtaining a composite video image by stitching two or more original video images according to pre-determined video arranging information;
   the encoding module is configured for encoding the composite video image obtained by the stitching module; and
   the sending module is configured for sending the composite video image encoded by the encoding module,
   wherein the video arranging information comprises a correspondence among an identity of a video collecting device collecting each of the two or more original video images, a position of each of the two or more original video images in the composite video image, and an identity of a video displaying device for displaying each of the two or more original video images.

4. The video processing apparatus according to claim 3, further comprising a first determining module configured for determining the video arranging information by performing media capability negotiation with an endpoint configured for receiving the composite video image, wherein
   the stitching module is configured for obtaining the composite video image by stitching the two or more original video images according to the video arranging information determined by the first determining module.

5. A video processing method, comprising:
   receiving a composite video image, wherein the composite video image is obtained by stitching two or more original video images and is then encoded;
   decoding the composite video image; and
   dividing the decoded composite video image into the two or more original video images and respectively sending each of the two or more original video images to a video displaying device for displaying each of the two or more original video images according to pre-determined video arranging information,
   wherein the video arranging information comprises a correspondence among an identity of a video collecting device collecting each of the two or more original video images, a position of each of the two or more original video images in the composite video image, and an identity of the video displaying device for displaying each of the two or more original video images.

6. The video processing method according to claim 5, further comprising: before the dividing the decoded composite video image,
   determining the video arranging information by performing media capability negotiation with an endpoint configured for sending the composite video image.

7. A video processing apparatus, comprising: a receiving module, a decoding module, and a dividing module, wherein
   the receiving module is configured for receiving a composite video image, the composite video image being obtained by stitching two or more original video images and then encoded;
   the decoding module is configured for decoding the composite video image received by the receiving module; and
   the dividing module is configured for dividing the decoded composite video image into the two or more original video images and respectively sending each of the two or more original video images to a video displaying device for displaying each of the two or more original video images according to pre-determined video arranging information,
   wherein the video arranging information comprises a correspondence among an identity of a video collecting device collecting each of the two or more original video images, a position of each of the two or more original video images in the composite video image, and an identity of the video displaying device for displaying each of the two or more original video images.

8. The video processing apparatus according to claim 7, further comprising a second determining module configured for determining the video arranging information by performing media capability negotiation with an endpoint configured for sending the composite video image, wherein
   the dividing module is configured for dividing the decoded composite video image into the two or more original video images according to the video arranging information determined by the second determining module.

9. A video processing method, comprising:
   obtaining a composite video image by stitching two or more original video images according to pre-determined video arranging information; encoding the composite video image; and sending the encoded composite video image;

receiving the composite video image; decoding the composite video image; and dividing the decoded composite video image into the two or more original video images and respectively sending each of the two or more original video images to a video displaying device for displaying each of the two or more original video images according to the pre-determined video arranging information, wherein the video arranging information comprises a correspondence among an identity of a video collecting device collecting each of the two or more original video images, a position of each of the two or more original video images, and an identity of the video displaying device for displaying each of the two or more original video images.

10. The video processing method according to claim 9, further comprising: determining the video arranging information by performing media capability negotiation.

11. A video processing system, comprising: a stitching module, a encoding module, a sending module, a receiving module, a decoding module, and a dividing module, wherein the stitching module is configured for obtaining a composite video image by stitching two or more original video images according to pre-determined video arranging information;

the encoding module is configured for encoding the composite video image obtained by the stitching module;

the sending module is configured for sending the composite video image encoded by the encoding module;

the receiving module is configured for receiving the composite video image sent by the sending module;

the decoding module is configured for decoding the composite video image received by the receiving module; and the dividing module is configured for dividing the decoded composite video image into the two or more original video images and respectively sending each of the two or more original video images to an external video displaying device for displaying each of the two or more original video images according to the pre-determined video arranging information, wherein the video arranging information comprises a correspondence among an identity of a video collecting device collecting each of the two or more original video images, a position of each of the two or more original video images, and an identity of the video displaying device for displaying each of the two or more original video images.

12. The video processing system according to claim 11, wherein the stitching module is further connected to two or more video collecting devices respectively for collecting the two or more original video images, and the system comprises a Multipoint Control Unit (MCU) and multiple terminals comprising a local terminal and a remote terminal interacting through the MCU, wherein each of the multiple terminals is externally connected to a video collecting device and a video displaying device, and comprises the stitching module, the encoding module, the sending module, the receiving module, the decoding module, the dividing module, a first determining module, and a second determining module; and the MCU comprises the stitching module, the encoding module, the sending module, the receiving module, the decoding module, the dividing module, the first determining module, and the second determining module.

13. The video processing system according to claim 11, further comprising a first determining module and a second determining module configured for determining the video arranging information by performing media capability negotiation, wherein the stitching module is configured for obtaining the composite video image by stitching the two or more original video images according to the video arranging information determined by the first determining module; and the dividing module is configured for dividing the decoded composite video image into the two or more original video images according to the video arranging information determined by the second determining module.

14. The video processing system according to claim 13, wherein the stitching module, the encoding module, the sending module and the first determining module are provided in a local terminal externally connected to a video collecting device; and the receiving module, the decoding module, the dividing module, and the second determining module are provided in a remote terminal externally connected to a video displaying device.

15. The video processing system according to claim 13, further comprising a Multipoint Control Unit (MCU) configured for implementing interaction between a local terminal and one or more remote terminals.

* * * * *